(12) United States Patent  
Chae

(10) Patent No.: US 10,097,703 B2  
(45) Date of Patent: Oct. 9, 2018

(54) IMAGE PRINTING DEVICE AND METHOD USING DISPLAY DEVICE

(71) Applicant: Kyu Yeol Chae, Seoul (KR)

(72) Inventor: Kyu Yeol Chae, Seoul (KR)

( * ) Notice: Subject to any disclaimer, the term of this patent is extended or adjusted under 35 U.S.C. 154(b) by 268 days.

(21) Appl. No.: 15/137,758

(22) Filed: Apr. 25, 2016

(65) Prior Publication Data

US 2016/0316074 A1 Oct. 27, 2016

Related U.S. Application Data

(63) Continuation of application No. PCT/KR2014/010281, filed on Oct. 30, 2014.

(30) Foreign Application Priority Data

Oct. 30, 2013 (KR) .................. 10-2013-0130132

(51) Int. Cl.
| | |
|---|---|
| *H04N 1/00* | (2006.01) |
| *G06F 3/13* | (2006.01) |
| *G06F 1/16* | (2006.01) |
| *H04N 1/12* | (2006.01) |
| *H04N 1/50* | (2006.01) |

(52) U.S. Cl.
CPC ....... *H04N 1/00169* (2013.01); *G06F 1/1632* (2013.01); *G06F 3/13* (2013.01); *H04N 1/00161* (2013.01); *H04N 1/12* (2013.01); *H04N 1/50* (2013.01)

(58) Field of Classification Search
CPC ........... H04N 1/00127; H04N 1/00129; H04N 1/00267; H04N 1/00307; H04N 1/00161; H04N 1/121; G06F 1/1632; G06F 3/13
See application file for complete search history.

(56) References Cited

U.S. PATENT DOCUMENTS

| 4,810,058 A | * | 3/1989 | Sangyoji | ........... G02F 1/133526 |
| | | | | 347/136 |
| 2001/0055121 A1 | * | 12/2001 | Omura | ........................ B41J 3/36 |
| | | | | 358/1.9 |
| 2004/0070739 A1 | * | 4/2004 | Yamamoto | ........... G03B 27/725 |
| | | | | 355/18 |

FOREIGN PATENT DOCUMENTS

| JP | H10-104752 A | 4/1998 |
| JP | 2000-162407 A | 6/2000 |
| JP | 2004-294607 A | 10/2004 |
| JP | 2004-294608 A | 10/2004 |

(Continued)

*Primary Examiner* — Jamares Q Washington  
(74) *Attorney, Agent, or Firm* — Mintz Levin Cohn Ferris Glovsky and Popeo, P.C.; Kongsik Kim; Jhongwoo Jay Peck

(57) ABSTRACT

An image printing device using a display device according to an embodiment of the present invention comprises: a light collecting device for substantially focusing light output from the display device on a screen of the display device in a vertical direction; and a photographic paper which is located on the light collecting device and is photosensed by light provided from the display device through the light collecting device so that an image displayed on the display device is formed, wherein movement of the photographic paper provided in the image printing device is controlled by an external control device in which the display device is mounted, so that an image displayed on the display device can be formed in the photographic paper provided in the image printing device.

13 Claims, 22 Drawing Sheets

(56) References Cited

FOREIGN PATENT DOCUMENTS

KR    10-2005-0037041 A    4/2005

* cited by examiner

IMAGE PRINTING DEVICE AND METHOD USING DISPLAY DEVICE

CROSS REFERENCE TO RELATED APPLICATIONS

This application is a continuation of International Application No. PCT/KR2014/010281 filed on Oct. 30, 2014, which claims priority to Korean Application No. 10-2013-0130132 filed on Oct. 30, 2013, which applications are incorporated herein by reference.

TECHNICAL FIELD

The present invention relates to an apparatus and method for outputting an image, and more particularly, to an apparatus and method for outputting an image displayed on a screen of a display device.

BACKGROUND ART

A variety of functions have recently been provided in a portable device such as a cellular phone or a smartphone. Particularly, since the portable device is equipped with a built-in digital camera, it may take a picture at any time in any place, and store the picture or transmit the picture to an Internet server or a portable device of another user. Further, the portable device may receive various types of content such as text, images, and videos through a mobile communication network, a wireless Internet, or a short-range communication network, and store the received content. When a user wants the content, the portable device may display the content through its display device. Further, as a camera with a higher resolution and more functions is available in the portable device, the portable device satisfies the user as much as a conventional digital camera.

With the portable device having the digital camera, the user may display and view a captured image on a screen at any time. Meanwhile, the user may need to print the image on a photographic paper, rather than to display it on a screen. In order to print a captured picture on a photographic paper, although inconvenient, the user should provide a picture file stored in the portable device to a printing shop and get the printing shop to deliver a printed picture to the user, or the user should visit a printing shop and pick up a printed picture at the printing shop in person.

Recently, photo printers for printing a portable-size picture, such as "LG Pocket Photo®" of LG Electronics and "Polaroid® GL 10" of Polaroid, have been commercialized. However, such a conventional photo printer requires multiple electronic parts including a communication device for communicating with a computer or a portable device, a memory for storing a received photo file, a processor for providing overall control to the printer, and a battery built inside the printer. Additionally, the conventional photo printer needs an ink or a heat transfer device for forming an image on a photographic paper according to the type of the photographic paper. Due to the use of a lot of internal parts, a manufacturing process of the conventional portable photo printer is complex. Due to its large size and great weight, the conventional photo printer is inconvenient to carry. Particularly because the conventional photo printer requires expensive internal electronic parts, the complete product is expensive, which makes it difficult to be widely used.

SUMMARY

An object of the present invention devised to solve the conventional problem is to provide an apparatus and method for facilitating printing of an image displayed on a display device of a portable device.

Another object of the present invention is to provide an apparatus having a simple structure and method for facilitating printing of an image displayed on a display device of a small-size portable device.

In an aspect of the present invention, an image printing device using a display device includes a light collector for focusing light output from the display device in a direction substantially perpendicular to a screen of the display device, and a photographic paper which is positioned over the light collector, and on which an image displayed on the display device is formed through exposure to light received from the light collector. An external control device having the display device controls movement of the photographic paper in the image printing device to form the image displayed on the display device on the photographic paper in the image printing device.

The image printing device includes a light collector for focusing light output from the display device in a direction substantially perpendicular to a screen of the display device, and a photographic paper which is positioned over the light collector, and on which an image displayed on the display device is formed through exposure to light received from the light collector.

In another aspect of the present invention, a portable device for controlling an image printing device includes a display device for displaying an image to be printed, a communication unit configured to be connected to an interface unit of the image printing device, and a controller for controlling movement of at least one of a photographic paper and a light shutter in the image printing device to form the image displayed on the display device on the photographic paper in the image printing device.

In another aspect of the present invention, a method for printing an image using a display device includes receiving an image print request through an input unit of a portable device, displaying an image to be printed, on a display device of the portable device, and controlling movement of at least one of a photographic paper and a light shutter in an image printing device connected to the portable device, to form an image displayed on the display device on the photographic paper in the image printing device.

In another aspect of the present invention, in a non-transitory computer-readable storage medium recording a program, the program performs operations of receiving an image print request through an input unit of a portable device, displaying an image to be printed, on a display device of the portable device, and controlling movement of at least one of a photographic paper and a light shutter in an image printing device connected to the portable device, to form an image displayed on the display device on the photographic paper in the image printing device.

DETAILED DESCRIPTION

Figure 1:
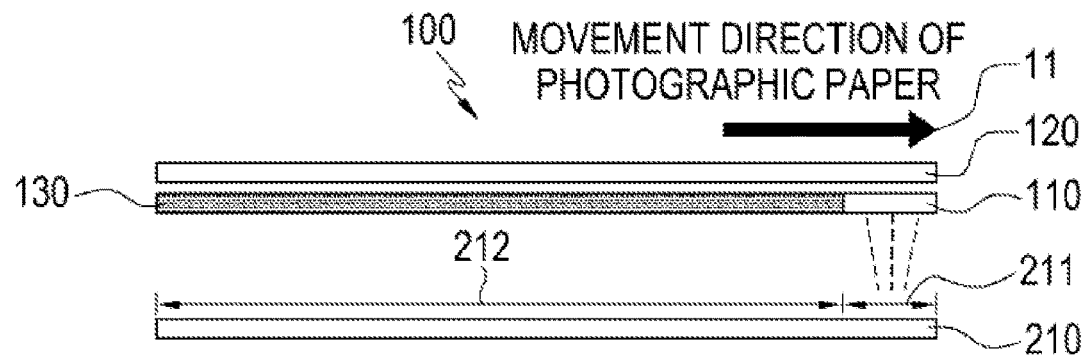
FIG. 1 is a view illustrating an image printing device using a display device according to an embodiment of the present invention.

Exemplary embodiments of the present invention will be described below in detail with reference to the attached drawings. However, the present invention is not limited or restricted by the exemplary embodiments. Like reference numerals denote components that perform substantially the same functions in the drawings.

While the ordinal terms such as first or second may be used to describe various components, the components are not limited by the terms. The terms are used only to distinguish one component from another component. For example, a first component may be referred to as a second component, and a second component may be referred to as a first component without departing the scope of the present invention. The terms as used herein are meant for the purpose of describing a specific embodiment, not intended to restrict the present invention. Unless otherwise specified, singular expressions include plural expressions.

FIG. 1 is a view illustrating an image printing device using a display device according to an embodiment of the present invention.

Referring to FIG. 1, an image printing device 100 according to an embodiment of the present invention includes a light collector 110 and a photographic paper 120.

The light collector 110 focuses light output from a display device 210 onto the photographic paper 120. The light collector 110 focuses light output in a plurality of directions from a screen of the display device 210, in a direction substantially perpendicular to the screen. In general, light output from the display device 210 travels in a direction parallel to the screen of the display device 210 as well as in the direction perpendicular to the screen. A manufacturer of the display device 210 wants to display an image uniformly on a screen of the display device 210 and also wants a user to be able to clearly view the image displayed on the screen from a direction tilted at a certain angle from the direction perpendicular to the screen as well as from the direction perpendicular to the screen. Accordingly, the display device 210 is generally configured so as to achieve uniform colors and brightness across the entire screen and form a wide angle of view. In the case of a liquid crystal display (LCD), for example, the LCD is equipped with a light diffusion plate and thus diffuses light emitted from a backlight unit in a plurality of directions. In the case of an organic light emitting diodes (OLED) display, the OLED display itself emits light and the emitted light travels in a plurality of directions. The light collector 110 focuses light output in a plurality of directions from the display device 210 onto a surface of the photographic paper 120. If the light output from the display device 210 is provided directly onto the photographic paper 120 without intervention of the light collector 110, an image displayed on the display device 210 may be formed blurry and unclear on the photographic paper 120. In contrast, if the light collector 110 is used, the image displayed on the display device 210 may be formed clear, not blurry on the photographic paper 120.

The display device 210 may include a first display area 211 and a second display area 212. An image that the user wants to be printed is displayed in the first display area 211. The image displayed in the first display area 211 may be transferred to the photographic paper 120 through the light collector 110. While the image displayed in the first display area 211 is transferred to the photographic paper 120, no image may be displayed in the second display area 212. Also, even though an image is displayed in the second display area 212, the image displayed in the second display area 212 may not be transferred to the photographic paper 120.

The photographic paper 120 is placed on the light collector 110. As the photographic paper 120 is exposed to light incident from the display device 210 through the light collector 110, an image displayed on the display device 210 is formed on the surface of the photographic paper 120. For example, the photographic paper 120 may be an instant camera film such as Fujifilm Instax® or PX100 and PX600 of Impossible Project. A plurality of photographic papers 120 may be stacked in a single cartridge and discharged outside of the cartridge one by one, when used.

The image printing device 100 may further include a light shutter 130. The light shutter 130 is arranged in parallel to the light collector 110 and covers the second display area 212 of the display device 210. Therefore, the light shutter 130 may block light from the area 212 other than the first display area 211 that displays an image to be printed. Black or a part of the image to be printed may be displayed in the second display area 212. If the photographic paper 120 is provided to be inserted in a cartridge, the cartridge may function as the light shutter 130 because the cartridge may block light output from the second display area 212 other than the first display area 211 displaying an image to be printed from reaching the photographic paper 120.

Figure 2A:
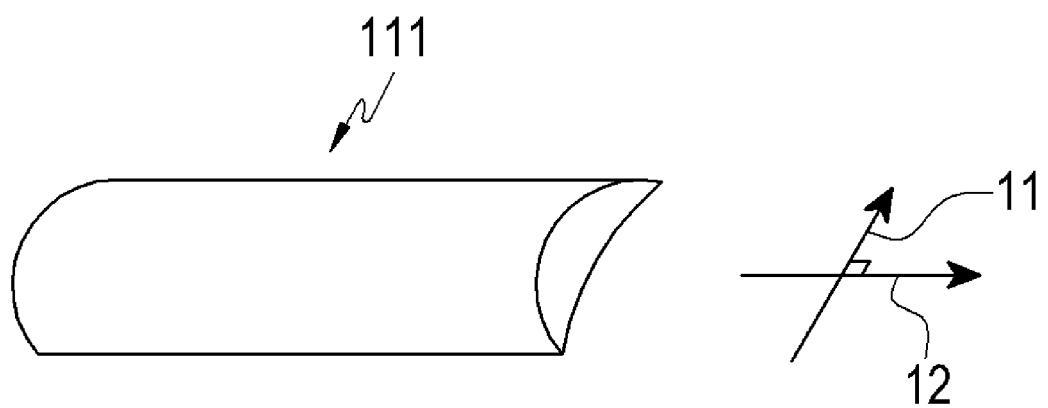
FIGS. 2A, 2B and 2C are views illustrating exemplary light collectors according to embodiments of the present invention.
Figure 2B:
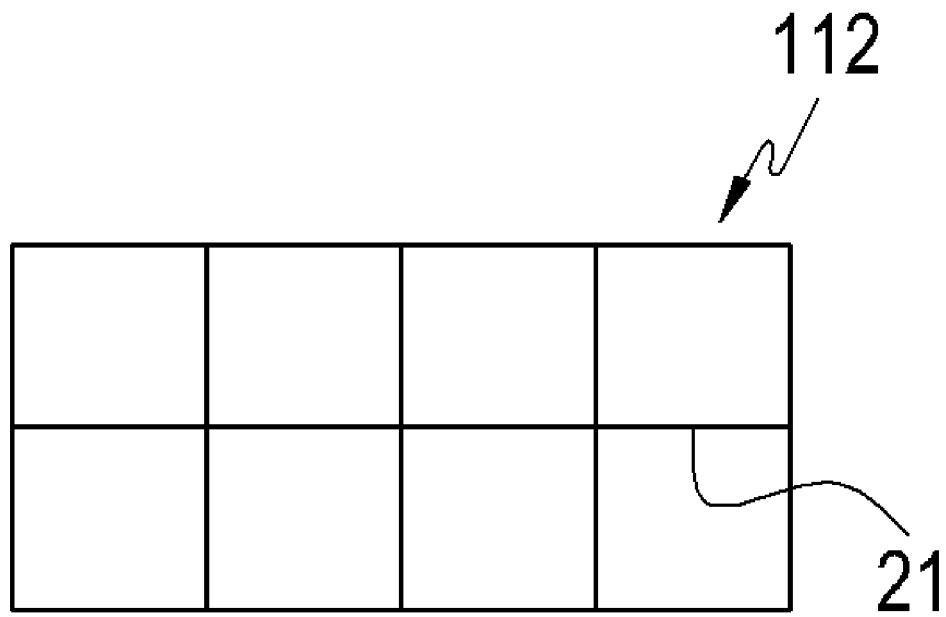
Figure 2C:
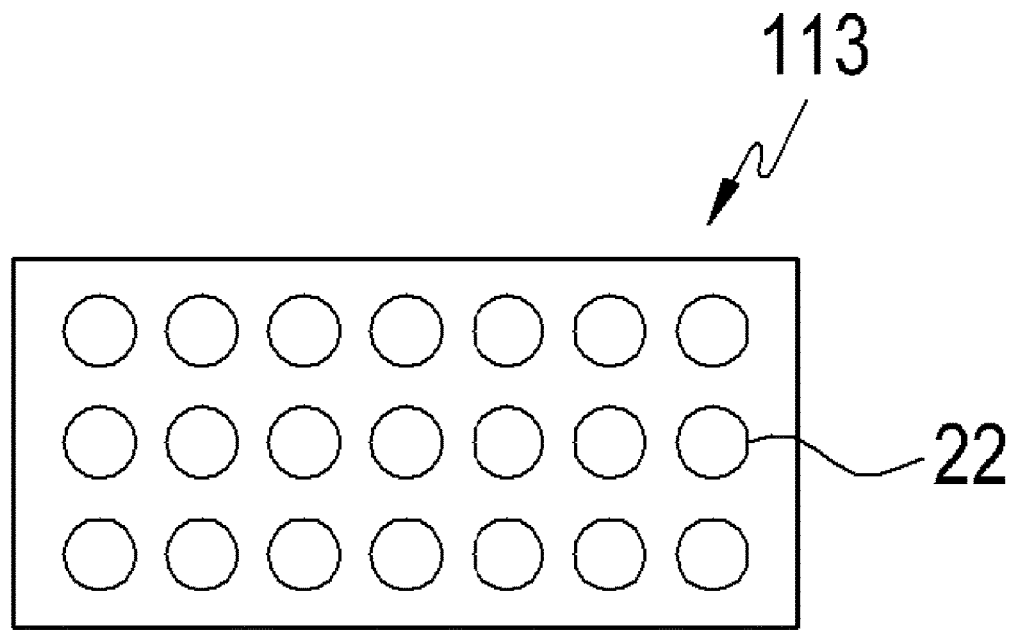

FIGS. 2a, 2b and 2c are views illustrating exemplary light collectors according to embodiments of the present invention. FIG. 2a illustrates an example in which the light collector 110 is configured as a linear lens 111. The linear lens 111 is disposed on the display device 210 and transfers light corresponding to an image displayed on the display device 210 onto the photographic paper 120. The linear lens 111 is extended in a direction, for example, a second direction 12, perpendicular to a movement direction of the photographic paper 120, for example, a first direction 11.

FIGS. 2b and 2c illustrate examples in which the light collector 110 is configured as vertical filters 112 and 113, respectively. The vertical filters 112 and 113 are disposed on the display device 210 and transfer light corresponding to an image displayed on the display device 210 onto the photographic paper 120. FIG. 2b illustrates the vertical filter 112 that is a light angle-blocking type. The vertical filter 112 blocks light incident at an angle other than that perpendicular to a screen of the display device 210, out of light output from the display device 210 by means of grids 21 for blocking viewing angle. The grids 21 may be spaced from one another by, for example, 10 μm~100 μm. FIG. 2c illustrates the vertical filter 113 that is a microlens type. The microlens-type vertical filter 113 may focus light output from the display device 210 onto the photographic paper 120 by means of a plurality of microlenses 22, so that an image displayed on the display device 210 may be formed appropriately, not blurry on the photographic paper 120.

Figure 3:
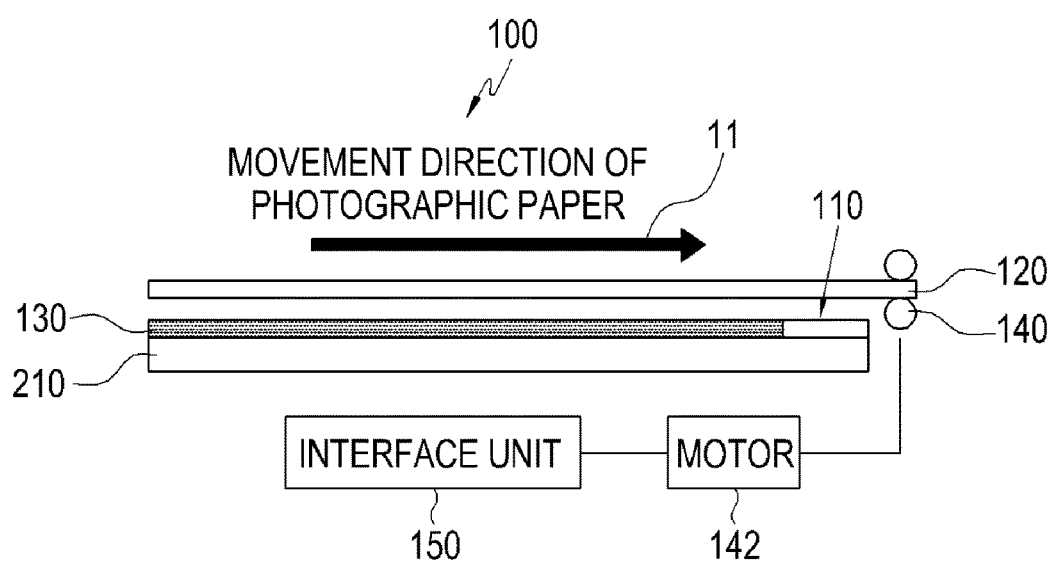
FIG. 3 is a view illustrating an image printing device using a display device according to an embodiment of the present invention.

FIG. 3 is a view illustrating an image printing device using a display device according to an embodiment of the present invention.

Referring to FIG. 3, the image printing device 100 may further include a roller 140 for moving the photographic paper 120, a motor 142 for rotating the roller 140, and an interface unit 150 for providing the motor 142 with a control command for controlling to drive the motor 142, received from an external control device (not shown) having the display device 210. The roller 140 and the motor 142 are an exemplary carrying device for carrying the photographic paper 120. If the image printing device 100 is connected to an external control device 200 through the interface unit 150 so that they may communicate with each other, an on/off operation of the motor 142 may be controlled by the external control device 200.

The image printing device 110 may further include a voltage control module (not shown) for controlling the magnitude of a control voltage applied to the motor 142 through the interface unit 150.

The interface unit 150 may include a connector for direct connection to the external control device by cable (for example, a universal serial bus (USB) port or a dedicated port), or a short-range communication module for wireless connection to the external control device by wireless short-range communication. The external control device may be a portable communication device such as a smartphone or a cellular phone, or any portable device equipped with a display device, such as a digital camera or a vehicle black box. Accordingly, the interface unit 150 may be a wired or wireless interface for providing a control command received from the external control device to the motor 142.

An operation for printing an image on the photographic paper 120 in the image printing device 100 may be controlled by the external control device. Therefore, an independent microprocessor may not be provided in the image printing device 100. A memory may not be provided in the image printing device 100 either. The image printing device 100 may receive a driving voltage from the external control device. Thus, a battery may not be provided in the image printing device 100. Accordingly, the image printing device 100 does not need a complex device such as an application processor (AP) or a digital signal processor (DSP), is simplified in structure, and is readily fabricated. Consequently, a cheap printing device may be provided. Obviously, the image printing device 100 may further include at least a part of the microprocessor, the memory, and the battery according to implementation of the image printing device 100. For example, if the interface unit 150 is configured as a wireless short-range communication module, the image printing device 100 may include a battery for supplying power to the short-range communication module, a motor, and a lamp. For example, if the interface unit 150 is configured as a near field communication (NFC) chip, the NFC chip may include a simple program for an on/off operation of the motor 142. In this case, a memory may not be provided in the image printing device 100.

Figure 4:
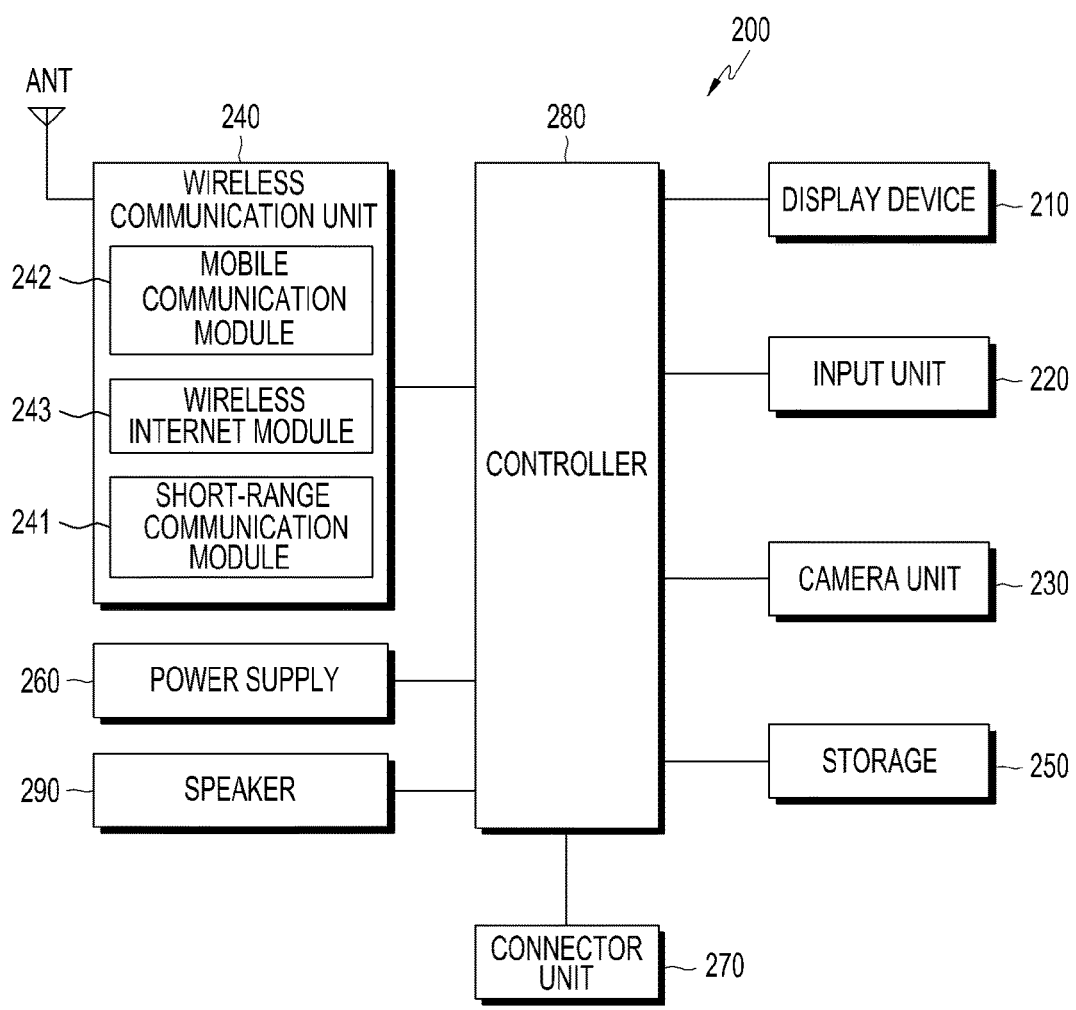
FIG. 4 is a view illustrating an external control device according to an embodiment of the present invention.
Figure 5:
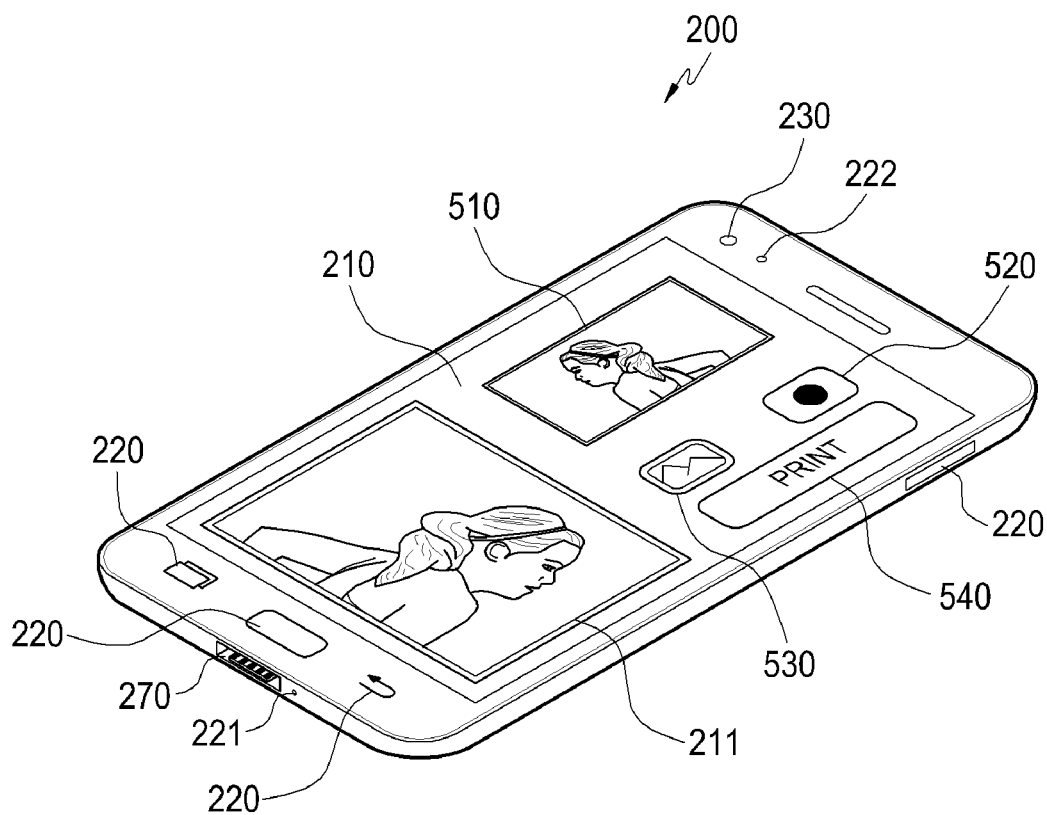
FIG. 5 is a front perspective view of an external control device according to another embodiment of the present invention.
Figure 6:
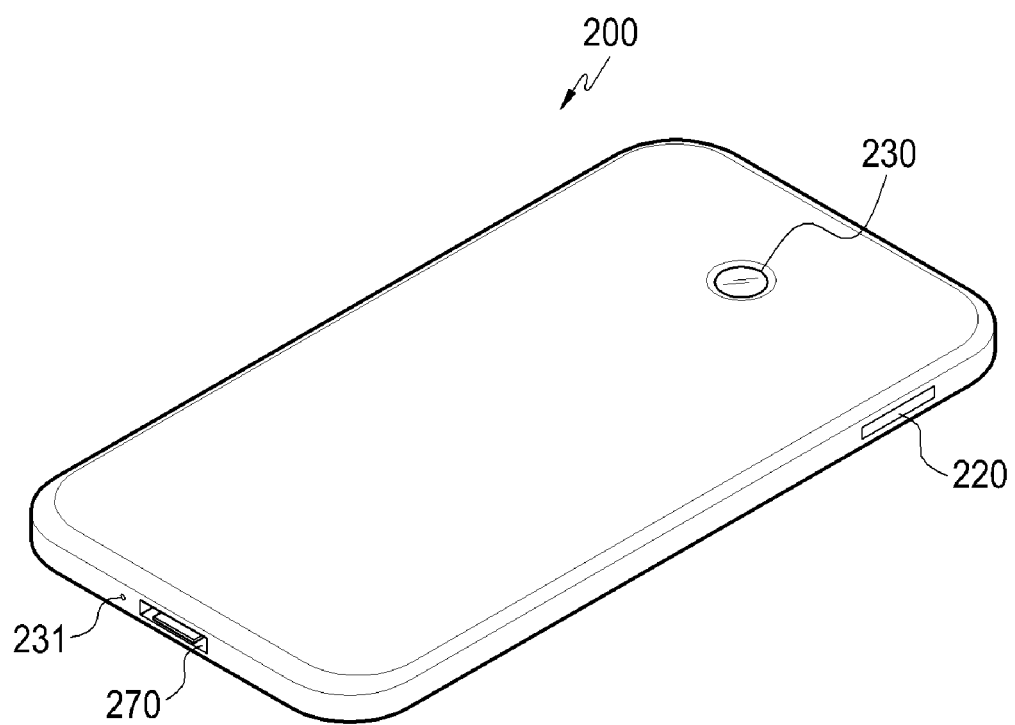
FIG. 6 is a rear perspective view of an external control device according to another embodiment of the present invention.

FIG. 4 is a view illustrating an external control device according to an embodiment of the present invention, FIG. 5 is a front perspective view of an external control device according to another embodiment of the present invention, and FIG. 6 is a rear perspective view of an external control device according to another embodiment of the present invention.

Referring to FIGS. 4, 5 and 6, the external control device 200 may include the display device 210, an input unit 220, a camera unit 230, a wireless communication unit 240, a storage 250, a power supply 260, a connector unit 270, and a controller 280. Depending on implementation, two or more components may be integrated into one component or a single component may be separated into two or more components in the external control device 200. FIGS. 5 and 6 illustrate an example in which the external control device 200 is a portable device. The following description is given in the context of the external control device 200 being a portable device, by way of example.

The display device 210 displays an image received from the camera unit 230 or the wireless communication unit 240 or an image stored in the storage 250 in the external control device 200. The image is a picture, a figure, text, or a combination of them, and includes various types of images displayable on the display device 210. Also, the display device 210 may display various types of information processed in the portable device 200. For example, if the portable device 200 is operated in a call mode, the display device 210 displays a user interface (UI) or graphic user interface (GUI) related to a call. Meanwhile, if the display device 210 and a touch pad are layered into a touch screen, the display device 210 may be used as an input device as well as an output device. Thus, the input unit 220 may be configured in the display device 210, and the user may input an intended user command to the display device 210 by touching a key or button formed in the display device 210.

The input unit 220 generates key input data that the user inputs to control an operation of the portable device 200. The input unit 220 may include a key pad, a dome switch, a (resistive or capacitive) touch pad, a jog wheel, a jog switch, or the like. Particularly if a touch pad is layered with the display device 210, the touch pad and the display device 210 form a touch screen. Also, the input unit 220 may include a microphone for receiving a voice command from the user, and a sensor for sensing a user command input by a user gesture, such as an infrared sensor, a proximity sensor, or an ultrasonic sensor. If a user gesture is input through the camera unit 230, the camera unit 230 may be incorporated in the input unit 220, functioning as the input unit 220.

The camera unit 230 captures an external object and provides the captured image of the external object. The image provided by the camera unit 230 may be displayed on the display device 210 or stored in the storage 250. The camera unit 230 may be formed on at least one of the front and rear surfaces of the portable device 200.

The wireless communication unit 240 may include a short-range communication module 241, a mobile communication module 242, and a wireless Internet module 243. The short-range communication module 241 performs short-range communication with the image printing device 100 according to an embodiment of the present invention. The short-range communication may be conducted by NFC, wireless fidelity Direct (Wi-Fi Direct), Bluetooth, infrared data association (IrDA), radio frequency identification (RFID), ultra wideband UWB), ZigBee, or the like. The mobile communication module 242 transmits and receives wireless signals to and from at least one of a base station, an external terminal, and a server over a mobile communication network. The wireless signals may include a voice call signal, a video call signal, or various types of data according to transmitting and receiving text/multimedia messages. The wireless Internet module 243 is used for wireless Internet connectivity, and may reside inside or outside the portable device 200.

The storage 250 may store an image to be printed by the image printing device 100 and a program for processing and controlling by the controller 280. The storage 250 may execute a function of temporarily storing input/output data.

The power supply 260 supplies power for operation of the portable device 200. Also, the power supply 260 may supply power for operation of the image printing device 100 to the image printing device 100 under control of the controller 280.

The connector unit 270 may be used as an interface for enabling the portable device 200 to conduct data communication with an external device or connecting the portable device 200 to an external power source. For example, as the connector unit 270 is connected to a USB port or a cable of the image printing device 100, the controller 280 may control an operation of the image printing device 100. The connector unit 270 may be referred to as a wired communication unit.

The controller 280 provides overall control to the portable device 200. Further, the controller 280 provides overall control to the image printing device 100 according to embodiments of the present invention. The controller 280 may also control output of a voice notification explaining an image printing method of the image printing device 100 through a speaker 290.

FIG. 5 illustrates an example in which the display device 210 is configured as a touch screen. Referring to FIG. 5, the display device 210 includes the first display area 211 for displaying an image to be printed. The first display area 211 may be formed at a position facing the photographic paper 120, when the portable device 200 is engaged with the image printing device 100. The display device 210 may further include a preview area 510, a shutter button 520, a gallery button 530, and a print button 540. For example, the shutter button 520, the gallery button 530, and the print button 540 may be formed as icons. The preview area 510 may display an image detected by an image sensor of the camera unit 230 so that the image may be previewed. When the shutter button 520 is touched by the user, the controller 280 captures an image displayed in the preview area 510, determining that a command for capturing an external object displayed in the preview area 510 has been received. When the gallery button 530 is touched by the user, the controller 280 may display pictures pre-stored in the storage 250 on the display. When the print button 540 is touched by the user, the controller 280 controls the image printing device 100 to make the image displayed in the printing image display area 211 formed on the photographic paper 120 inside the image printing device 100. Along with operation of the image printing device 100, the controller 280 may determine whether to display an image in the first display area 211, and control an image to be displayed and a time when the image is to be displayed. For example, at least a part of an original image may be displayed mirrored in the first display area 211 that displays the image to be printed. Since the photosensitive surface of the photographic paper 120 faces the screen of the display device 210, the original image should be mirrored on the screen of the display device 210 in order to form the original image on the photographic paper 120. Also, for example, a part of the original image may be displayed in the first display area 211, or a band image formed based on a part of the original image may be displayed mirrored in the first display area 211. The band image will be described below in detail.

FIGS. 7*a* to 7*d* are views illustrating use of an image printing device in conjunction with a portable device according to embodiments of the present invention.

Figure 7A:
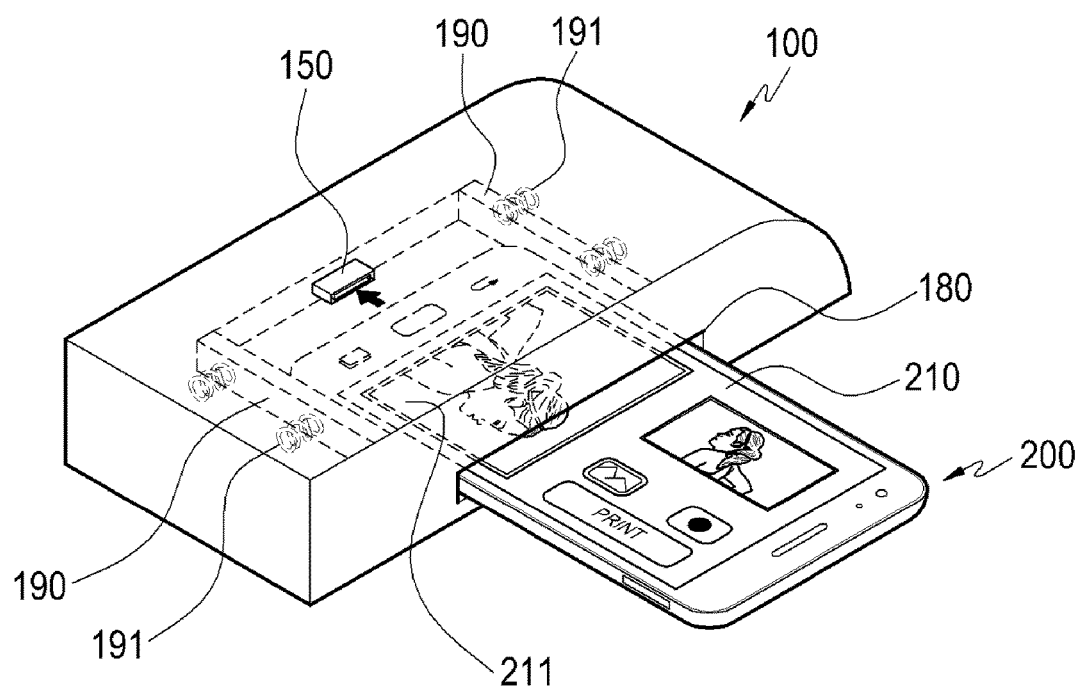
FIGS. 7A to 7D are views illustrating use of an image printing device in connection with a portable device according to embodiments of the present invention.

Referring to FIG. 7*a*, the portable device 200 may be inserted into a slot 180 formed on a side surface of the image printing device 100. As illustrated in FIG. 7*a*, when a bottom end portion of the portable device 200 is inserted into the slot 180, the connector unit 270 formed at a bottom end of the portable device 200 may be coupled with the interface unit 150 formed in the image printing device 100. Thus, the portable device 200 may control the image printing device 100 through the interface unit 150. The portable device 200 may also supply power to the image printing device 100 through the interface unit 150. Guides 190 may further be formed in the image printing device 100, for guiding the connector unit 270 of the portable device 200 inserted into the slot 180 to a position at which the interface unit 150 of the image printing device 100 is formed. The guides 190 may support the portable device 200, in contact with one or both side surfaces of the portable device 200, so that the portable device 200 may be fixed in the slot 180. Elastic members 191 may be additionally formed in the image printing device 100, for providing elasticity to the guides 190. When a relatively large portable device 200 is inserted into the slot 180 of the image printing device 100, the elastic members 191 provide elasticity to the guides 190 so that the guides 190 may retreat, guiding the portable device 200 to be appropriately inserted into the slot 180. Thus, the portable device 200 may be supported fixedly in the slot 180. Accordingly, the portable device 200 of any of various sizes may be stably engaged with the image printing device 100.

Figure 7B:
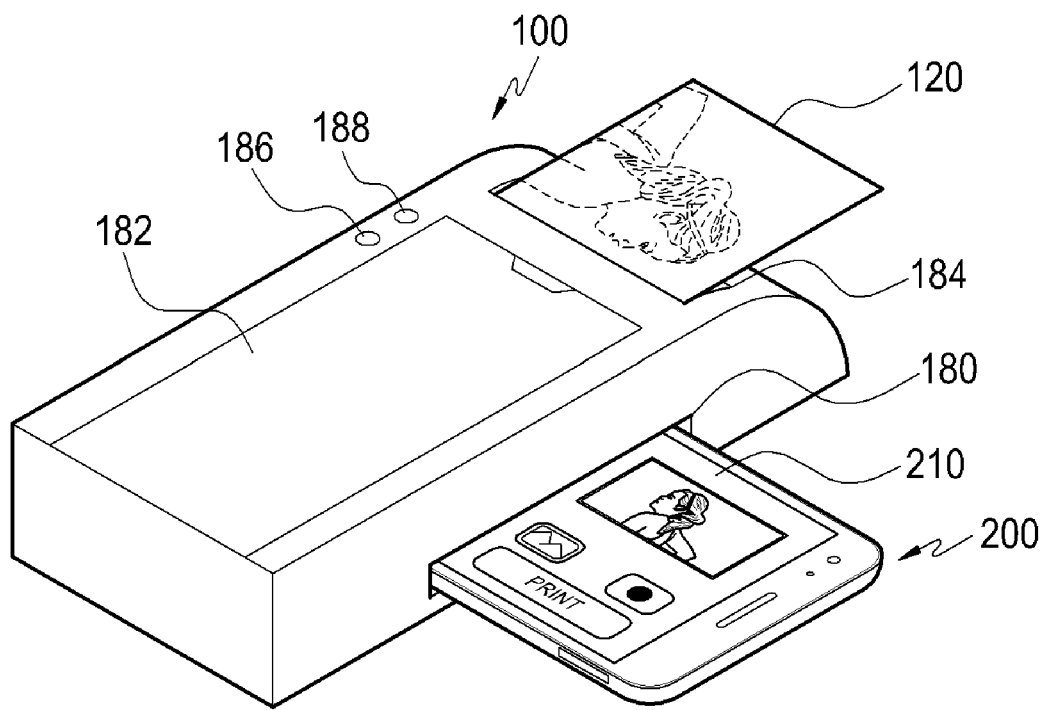

FIG. 7*b* illustrates discharge of the photographic paper 120 from the image printing device 100 according to an embodiment of the present invention. Referring to FIG. 7*b*, the image printing device 100 includes a cover 182 for placing the photographic paper 120 inside the image printing device 100, and a discharge outlet 184 for discharging the photographic paper 120. The cover 182 may be configured to be opened or closed or may be detachably formed in the image printing device 100. The controller 280 discharges the photographic paper 120 from the image printing device 100 after a predetermined time during which the image displayed in the first display area 211 of the display device 210 in the portable device 200 is printed on the photographic paper 120. A power lamp 186 and a print indication lamp 188 may be additionally installed on an exterior case of the image printing device 100. When the portable device 200 is coupled with the interface unit 150 of the image printing device 100, the power lamp 186 may be turned on. The print indication lamp 188 may be kept on during image printing in the image printing device 100 under the control of the portable device 200, thereby indicating image printing is in progress to the user. The lamps 186 and 188 may be turned on by a voltage applied from the portable device 200. If the image printing device 100 includes a battery, the lamps 186 and 188 may be turned on by means of the battery.

Figure 7C:
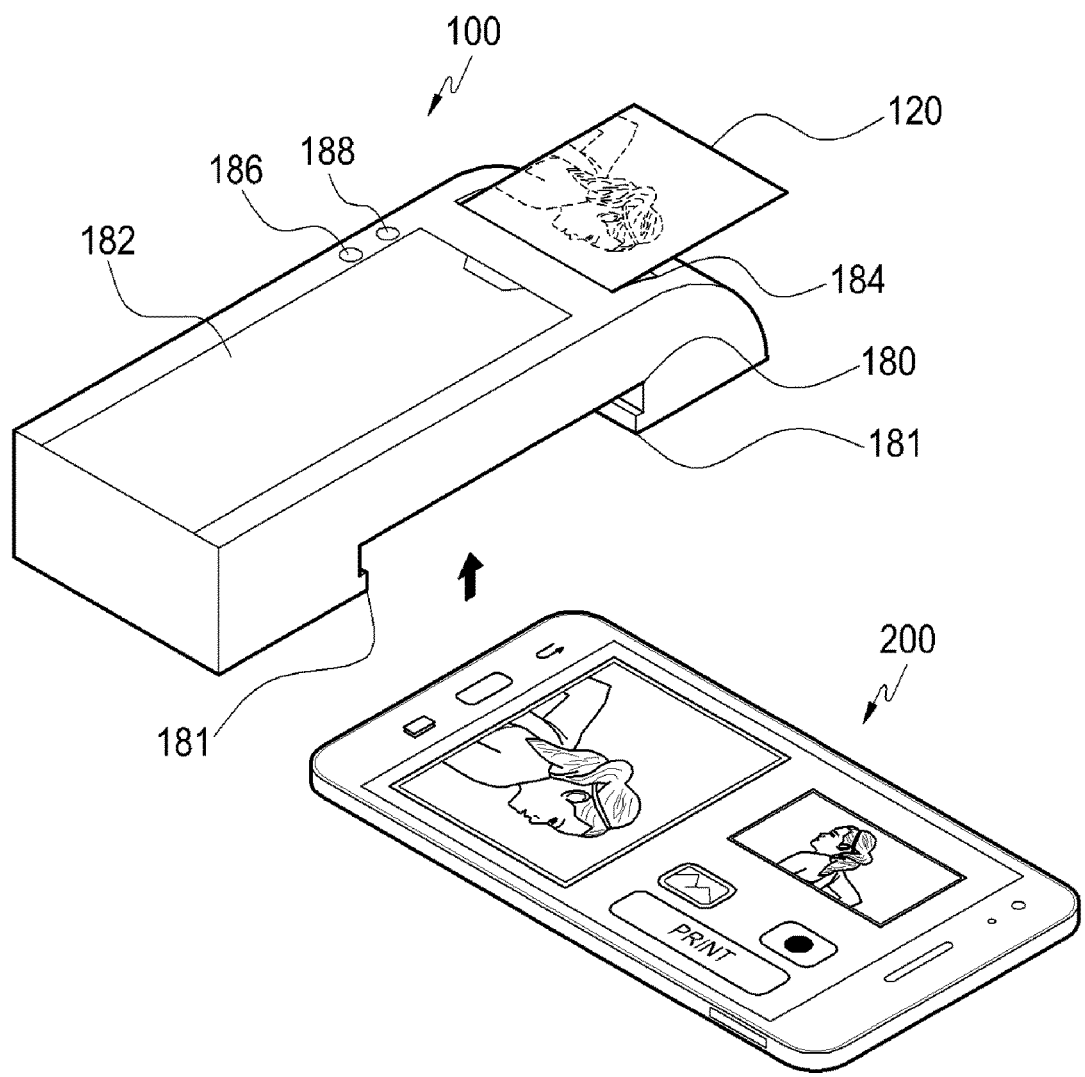
Figure 7D:
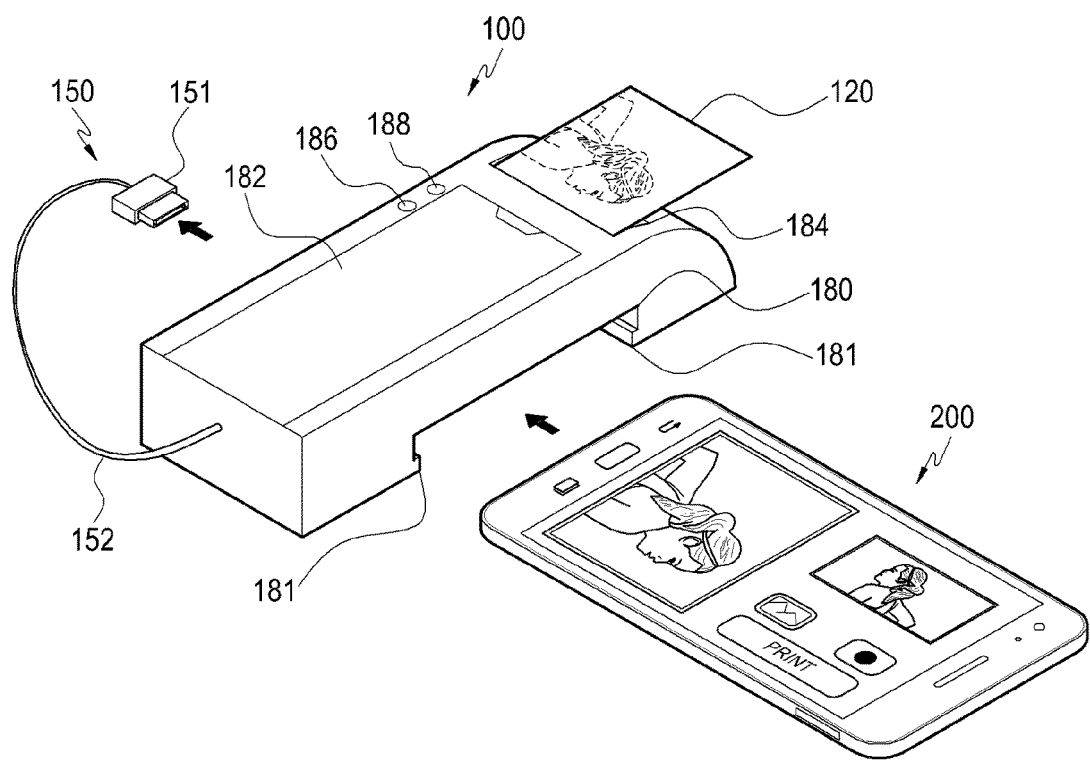

FIG. 7c illustrates use of an image printing device in conjunction with a portable device according to another embodiment of the present invention. Referring to FIG. 7c, the portable device 200 may be inserted into the slot 180 formed on a side surface of the image printing device 100. The slot 180 may be opened from its bottom and have catching portions 181 along both end portions of the slot 180. Therefore, the portable device 200 may be slidingly inserted into the slot 180 or inserted into the slot 180 from under the image printing device 100. The catching portions 181 may be elastic to appropriately insert the portable device 200. In the illustrated case of FIG. 7c, the image printing device 100 may be connected to the portable device 200 so that they may communicate with each other by wireless short-range communication. As illustrated in FIG. 7d, the interface unit 150 of the image printing device 100 may include a connector 151 and a cable 152. The image printing device 100 may be connected to the portable device 200 by using the connector 151 and the cable 152.

Figure 8:
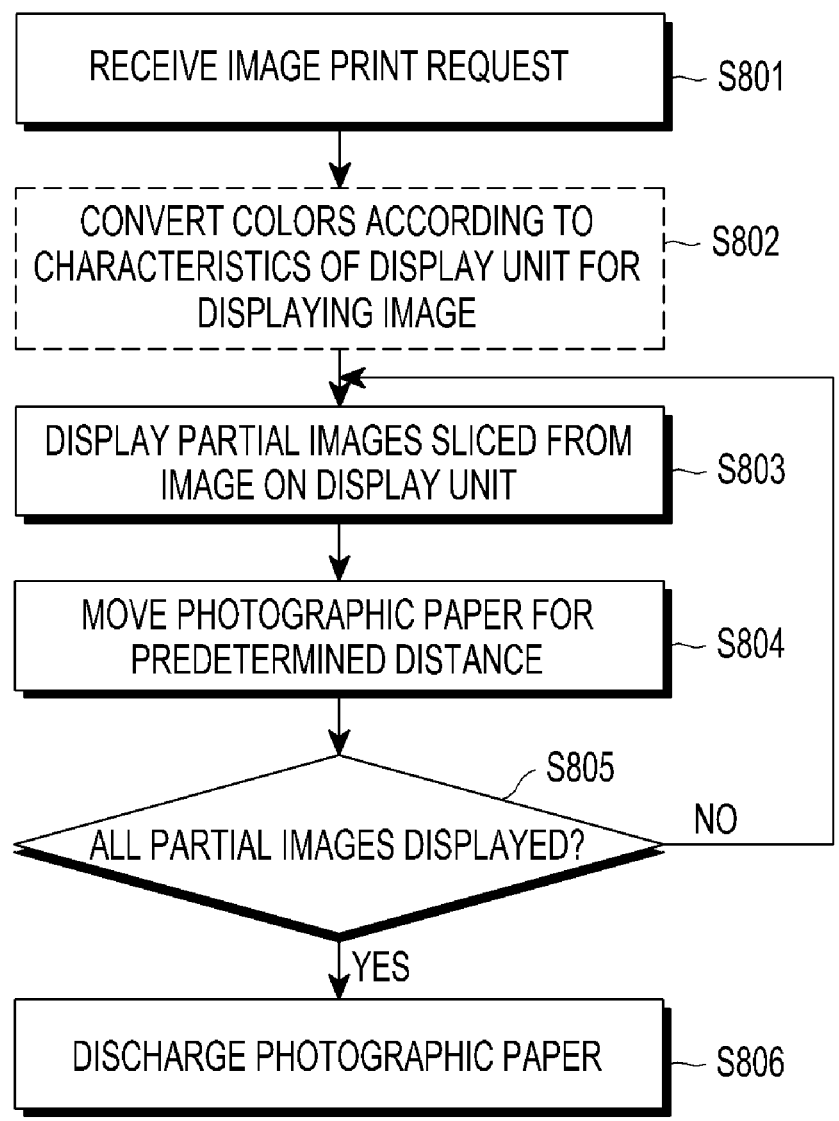
FIG. 8 is a flowchart illustrating an operation for printing an image in an image printing device using a display device according to an embodiment of the present invention.

FIG. 8 is a flowchart illustrating an operation for printing an image in an image printing device using a display device according to an embodiment of the present invention.

First of all, when the user connects the image printing device 100 to the portable device 200 and then inputs an image print request for an image displayed on the display device 210 through the input unit 220, the controller 280 of the portable device 200 receives the image print request in operation S801. The image requested for printing may be an image pre-stored in the storage 250 of the portable device 200 or an image input to the portable device 200 in real time through the camera unit 230. For example, as a predetermined part of the portable device 200, for example, a bottom end portion of the portable device 200 is inserted into the slot 180 of the image printing device 100, the interface unit 150 formed in the image printing device 100 is inserted into the connector unit 270 of the portable device 200. Thus, the image printing device 100 may be connected to the portable device 200 so that they may communicate with each other. Also, the portable device 200 may be connected to the image printing device 100 through the interface unit 150 wirelessly or wiredly, so that they may communicate with each other. When the image printing device 100 is connected to the portable device 200 in this manner, the first display area 211 of the display device 210 in which an image to be printed is displayed in the portable device 200 may face the photosensitive surface of the photographic paper 120 in the image printing device 100. Hereinafter, the image requested for printing will be referred to as an original image.

Then, the controller 280 subjects the original image to color conversion according to the characteristics of the display device 210. If the display device 210 is configured as, for example, an LCD or OLED display, the photosensitive characteristics of the photographic paper 120 may vary according to the light emitting type of the display device 210. Therefore, color conversion is performed by converting pixel data in such a manner that the image may be sensitized naturally on the photographic paper 120 according to the light emitting type of the display device 210, and thus the original image may be formed appropriately on the photographic paper 120. In operation S802, the original image may be displayed with its brightness inverted on the display device 210 according to the characteristics of the photographic paper 120. For example, in the case where the pixel values of the original image are 0 to 255, if the brightness of one point in the original image is '0' representing dark, a pixel data for displaying the point on the display device 210 may be set to '255' representing bright. On the contrary, if the brightness of one point in the original image is '255' representing bright, a pixel data for displaying the point on the display device 210 may be set to '0' representing dark. The color conversion operation S802 is optional and thus may be skipped.

Figure 9:
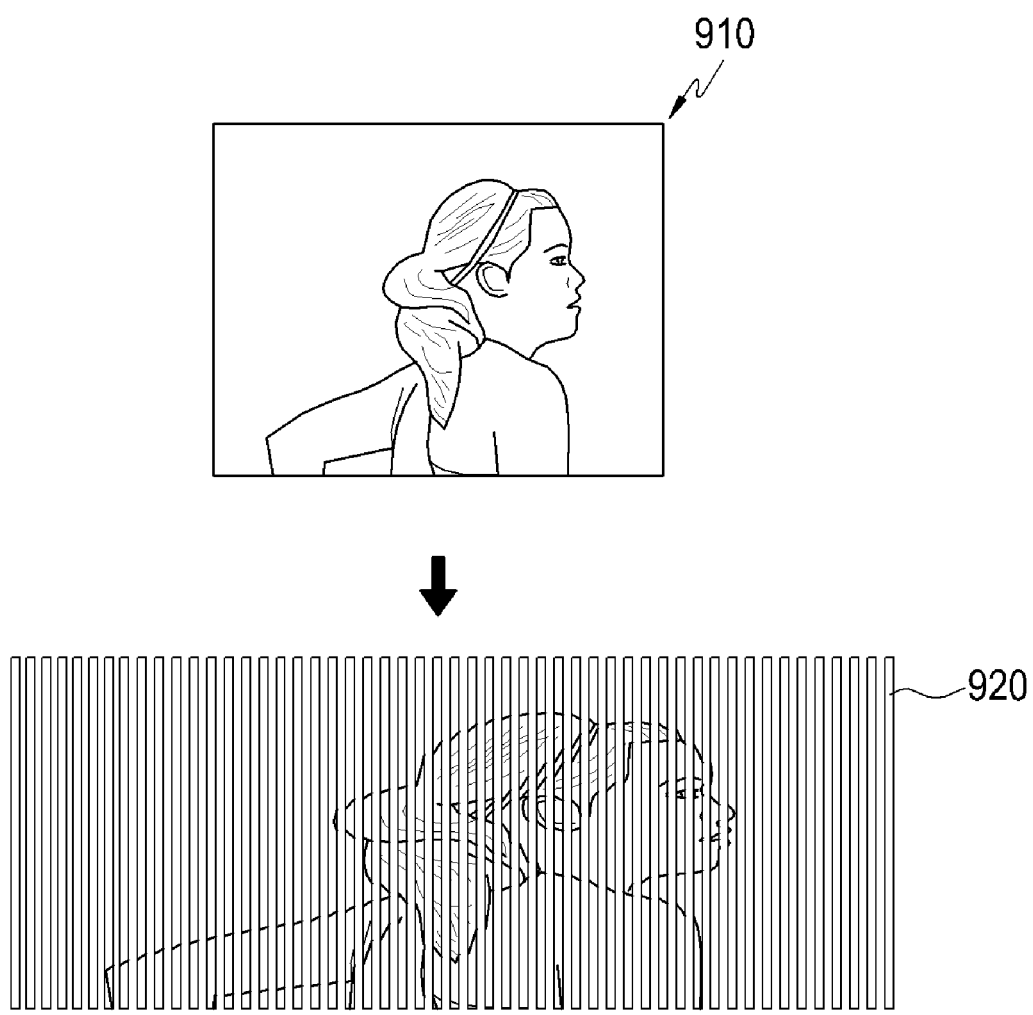
FIG. 9 is a view illustrating a partial image according to an embodiment of the present invention.

The controller 280 divides the original image requested for printing into a plurality of partial images each having a predetermined size, and displays a first partial image (for example, a partial image at the top end) out of the partial images on the display device 210 in operation S803. The partial images may be obtained by slicing the original image in a horizontal direction. The horizontal direction is a direction perpendicular to a movement direction of the photographic paper 120. Therefore, the movement direction of the photographic paper 120 may be referred to as a vertical direction. For example, if the original image includes m×n pixels (m and n are integers), each partial image may include one or more consecutive rows from among the pixels of the original image. If the original image is displayed rotated at 90 degrees on the display device 210, each image line may be a partial image with one or more consecutive columns from among the pixels of the original image. The partial images may include different parts of the original image, and when the partial images are successively concatenated, the original image may be formed. For example, referring to FIG. 9, an original image 910 may be divided into a plurality of partial images 920. Each partial image 920 is formed with one or more consecutive rows from among the pixels of the original image 910. Accordingly, the partial images 920 may be formed by slicing the original image 910 into a plurality of partial images 920.

A predetermined time after the first partial image of the original image is displayed on the display device 210 in operation S803, the controller 280 moves the photographic paper 120 for a predetermined distance in operation S804. A predetermined time during which the photographic paper 120 is exposed to the display device 210 may vary with the brightness of the display device 210. For example, if the display device 210 is bright, the predetermined time may be relatively short. On the other hand, if the display device 210 is dark, the predetermined time may be long relative to the case when the display device 210 is bright. The predetermined distance for which the photographic paper 120 is moved corresponds to the width of each partial image. That is, if the partial image is narrow, the predetermined distance is small, and if the partial image is wide, the predetermined distance is large. Also, the controller 280 may control constant movement of the photographic paper 120 at a predetermined velocity. Therefore, the controller 280 may control sequential display times of the partial images in correspondence with the velocity of the photographic paper 120.

Subsequently, the controller 280 determines whether the plurality of partial images of the original image have all been displayed on the display device 210 in operation S805.

If all of the partial images of the original image are not displayed on the display device 210 in operation S805, the controller 280 returns to operation S803 in which the next partial image is displayed on the display device 210 and repeats operation S804 in which the photographic paper 120 is moved for the predetermine distance. As the plurality of partial images of the original image are sequentially displayed on the display device 210 and the partial images are successively concatenated on the photographic paper 120, the original image may be formed on the photographic paper 120.

If it is determined that all of the plurality of partial images of the original image have been displayed on the display device 210, the controller 280 discharges the photographic paper 120 outside of the image printing device 100 in operation S806.

Figure 10:
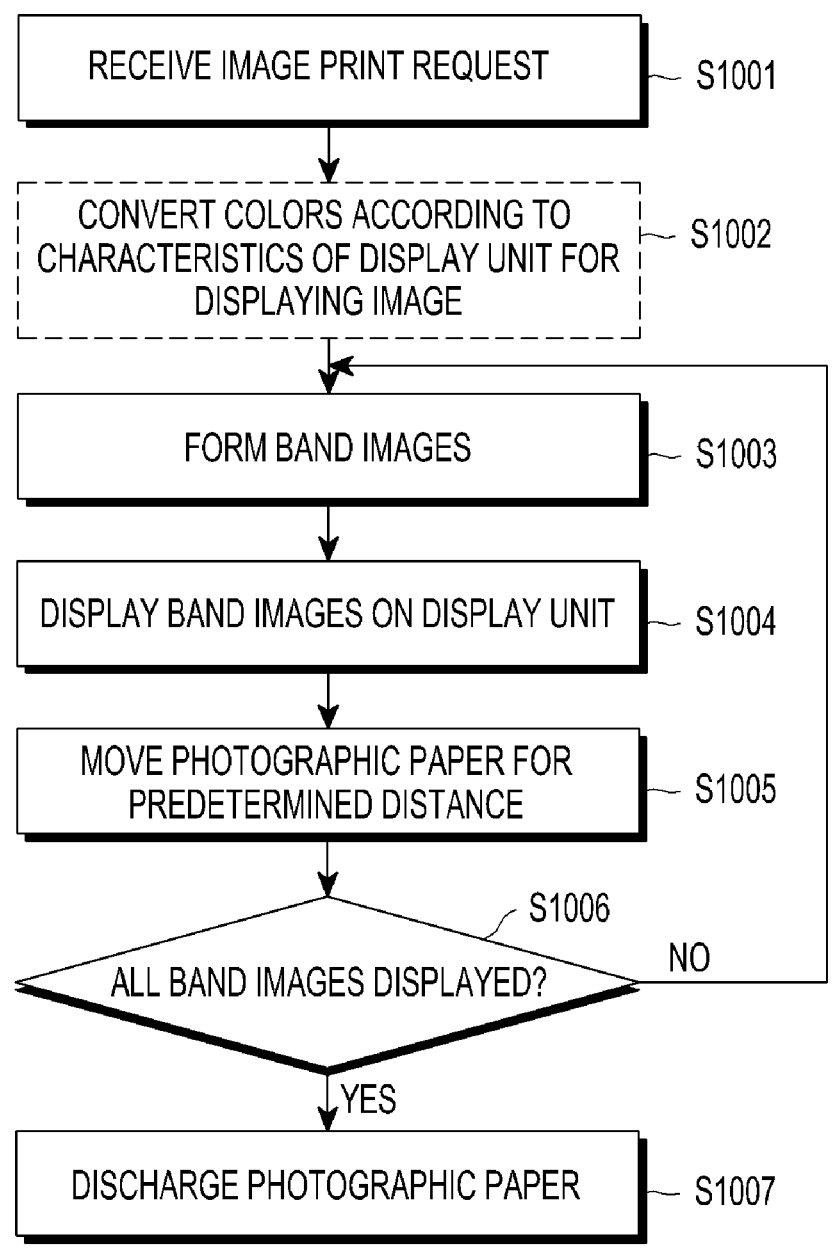
FIG. 10 is a flowchart illustrating an operation for printing an image in an image printing device using a display device according to another embodiment of the present invention.

FIG. 10 is a flowchart illustrating an operation for printing an image in an image printing device using a display device according to another embodiment of the present invention.

Upon receipt of an image print request for an image displayed on the display device 210 through the input unit 220 of the portable device 200 after the user connects the image printing device 100 to the portable device 200, the controller 280 of the portable device 200 receives the image print request in operation S1001. The portable device 200 may be connected to the image printing device 100 through the interface unit 150 wirelessly or wiredly so that the portable device 200 may communicate with the image printing device 100.

Then, the controller 280 subjects the original image requested for printing to color conversion according to the characteristics of the display device 210 in operation S1002. The color conversion operation S1002 is optional and thus may be skipped.

Figure 11:
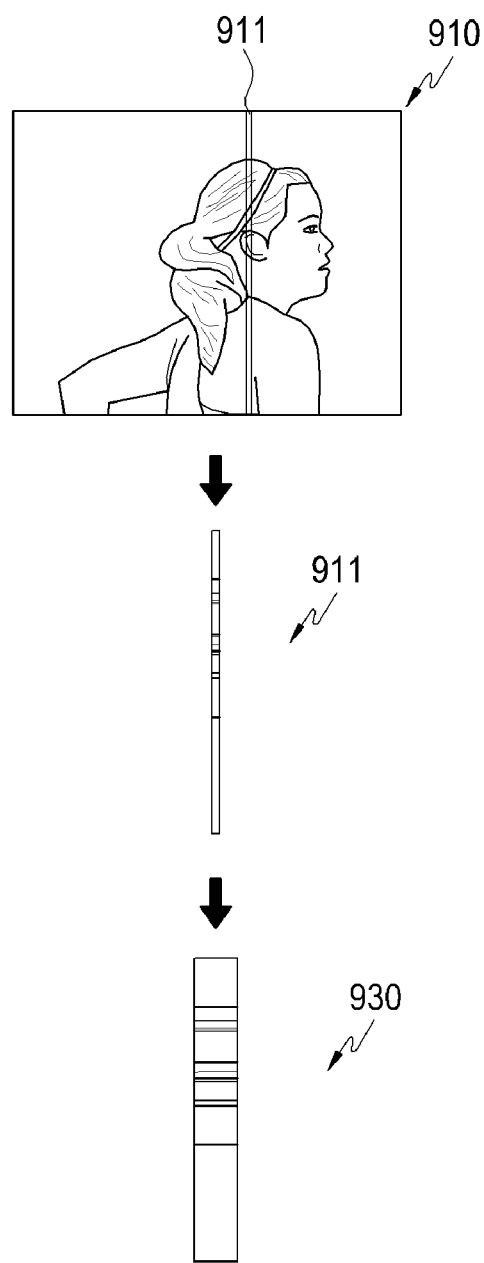
FIG. 11 is a view illustrating a band image according to an embodiment of the present invention.

The controller 280 forms band images out of the original image requested for printing in operation S1003 and displays the band images on the display device 210 in operation S1004. The band images may be displayed mirrored on the display device 210. FIG. 11 is a view illustrating an operation for generating a band image according to an embodiment of the present invention. Referring to FIG. 11, for example, if the original image 910 is comprised of m×n pixels (m and n are integers), a line image 911 corresponding to an image of each row arranged in a direction perpendicular to the movement direction of the photographic paper 120 is repeatedly copied and then a band image 930 is generated by concatenating the copied line images 911. The band image 930 includes a plurality of (for example, 10 to 50) identical line images 911. Therefore, the band image 930 takes the form of the line image 911 stretched in the movement direction of the photographic paper 120. The band image 930 may have a predetermined width d1. The width d1 may be set to be larger than the width d2 of the light collector 110 in consideration of the gap between the image printing device 100 and the portable device 200. For example, if the light collector 110 is configured as a linear lens, the width d1 may be larger than the size of the linear lens.

Figure 12A:
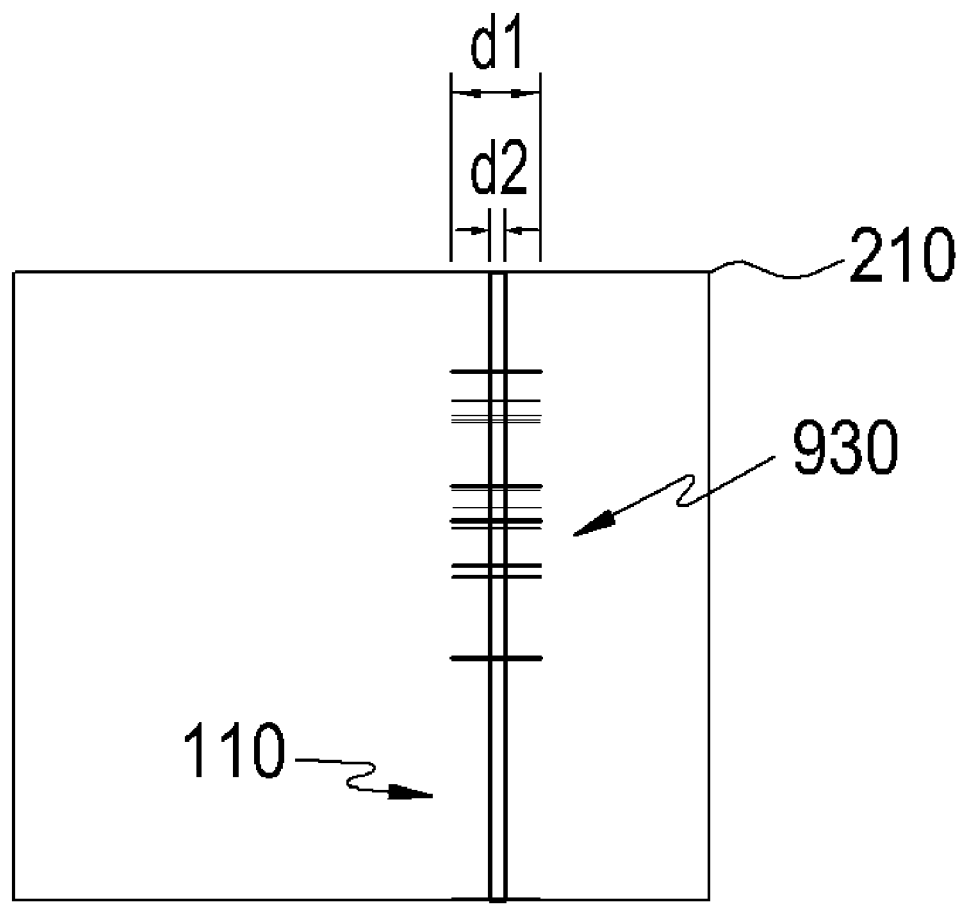
FIGS. 12A and 12B are views explaining a reason for using a band image according to an embodiment of the present invention.
Figure 12B:
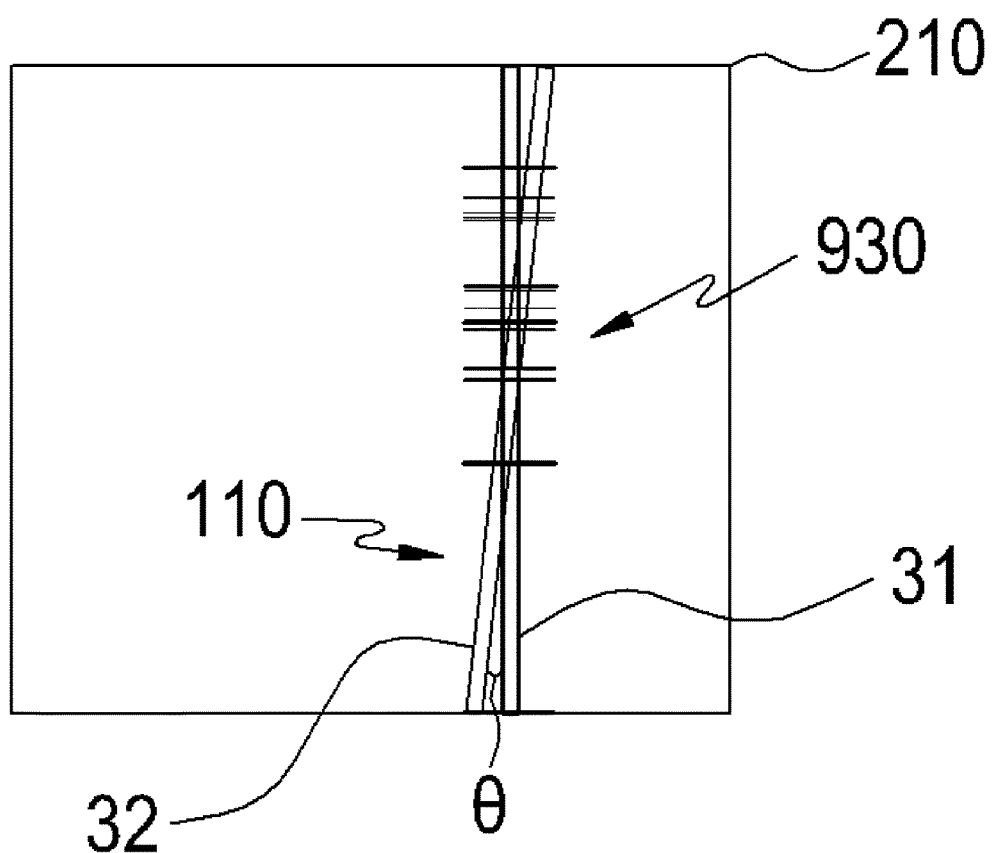

FIG. 12A illustrates an ideal position 31 for the light collector 110 in the image printing device 100, when the band image 930 is displayed on the display device 210 in the portable device 200. The light collector 110 is preferably arranged in parallel to the band image 930. However, since the image printing device 100 is detachably mounted to the portable device 200, each time the image printing device 100 is connected to the portable device 200, the positions of the image printing device 100 and the portable device 200 may be changed slightly due to the gap between the image printing device 100 and the portable device 200. Therefore, the light collector 110 of the image printing device 100 and the display device 210 of the portable device 200 may not be disposed at the ideal position 31. FIG. 12B illustrates a case in which when the band image 930 is displayed on the display device 210, an actual position 32 of the light collector 110 is deviated from the ideal position 31 by θ. If each line image 911 of the original image 910 is formed on the photographic paper 120 using the band image 930, the line image 910 may be formed appropriately on the photographic paper 120. That is, even though the light collector 100 is slightly out of focus, the light collector 100 may be positioned over the band image 930. As a consequence, each line image 911 may be formed on the photographic paper 120.

A predetermined time after the band image 930 formed using the line image 911 corresponding to the first row of the original image 910 is displayed on the display device 210, the controller 280 moves the photographic paper 120 for a predetermined distance in operation S1005. The predetermined distance for which the photographic paper 120 is moved corresponds to the width of the line image 911. That is, if the line image 911 is narrow, the predetermined distance is small, and if the line image 911 is wide, the predetermined distance is large. Also, the controller 280 may control constant movement of the photographic paper 120 at a predetermined velocity in operation S1005. Accordingly, the controller 280 may control sequential display of each band image 930 according to the velocity of the photographic paper 120.

Subsequently, the controller 280 determines whether all of band images 930 corresponding to all line images 911 of the original image have been displayed on the display device 210 in operation S1006.

If all of the band images 930 corresponding to the plurality of line images 911 of the original image have not been displayed on the display device 210, the controller 280 returns to operation S1003 in which the controller 280 forms a band image 930 corresponding to the next line image 911, and repeats operation S1004 in which the controller 280 displays the band image 930 on the display device 210, and operation S1005 in which the controller 280 moves the photographic paper 120 for the predetermined distance. As the band images 930 corresponding to the plurality of line images 911 forming the original image 910 are sequentially displayed on the display device 210 and the line images 911 are successively concatenated on the photographic paper 120, the original image 910 may be formed on the photographic paper 120.

If it is determined that all of the plurality of line images 911 forming the original image have been displayed on the display device 210 in operation S1006, the controller 280 discharges the photographic paper 120 outside of the image printing device 100 in operation S1007.

Figure 13:
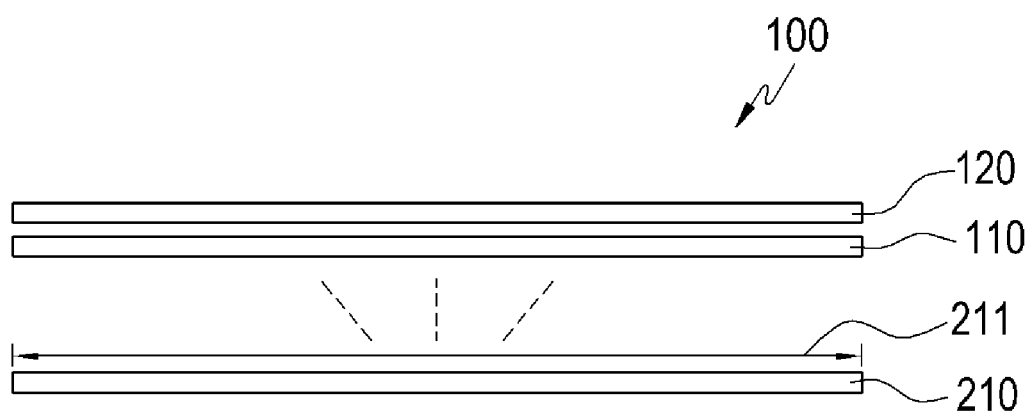
FIG. 13 is a view illustrating an image printing device using a display device according to another embodiment of the present invention.

FIG. 13 is a view illustrating an image printing device using a display device according to another embodiment of the present invention.

Referring to FIG. 13, the image printing device 100 according to another embodiment of the present invention includes the light collector 110 and the photographic paper 120.

The light collector 110 focuses light output from the display device 210 of the portable device 200 on the photographic paper 120. The light collector 110 focuses light output in a plurality of directions from a screen of the display device 210 on the photographic paper 120.

The light collector 110 is formed in a size corresponding to the first display area 211 that displays an image to be printed on the display device 210. A whole original image to be printed may be displayed mirrored in the first display area 21. The light collector 110 may be configured as a vertical filter or a planar lens. The light collector 110 is positioned over the display device 210 and provides light corresponding to the original image displayed on the display device 210 to the photographic paper 120.

The size of an image formed on the photographic paper 120 may be equal to or smaller than the size of an image displayed in the first display area 211 of the display device 210. The size of an image formed on the photographic paper 120 may be controlled according to the light collector 110. Accordingly, the size of the photographic paper 120 may be equal to or smaller than the size of an image displayed on the display device 210. That is, the printing image display 211 for displaying an image to be printed in the display device 210 may be formed to be as large as or larger than the photographic paper 120.

Figure 14:
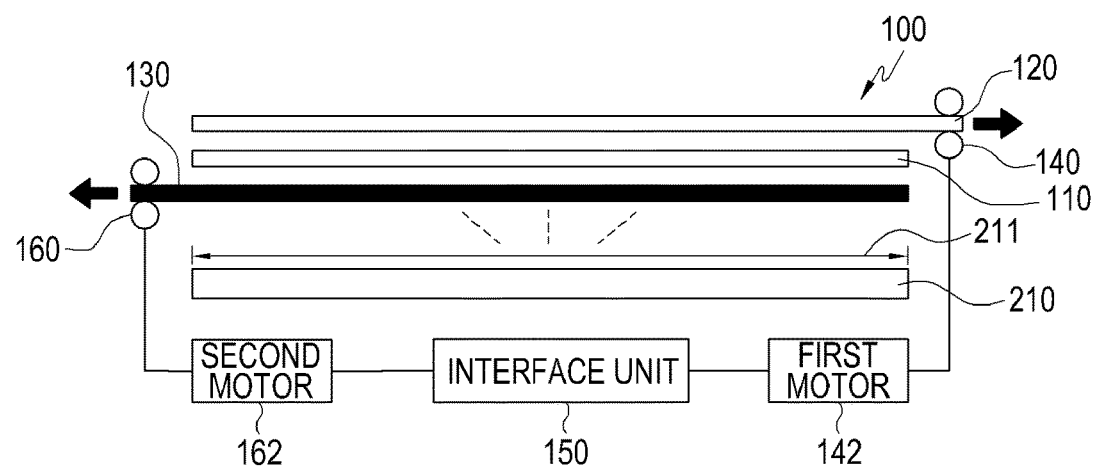
FIG. 14 is a view illustrating an image printing device using a display device according to another embodiment of the present invention.
Figure 15:
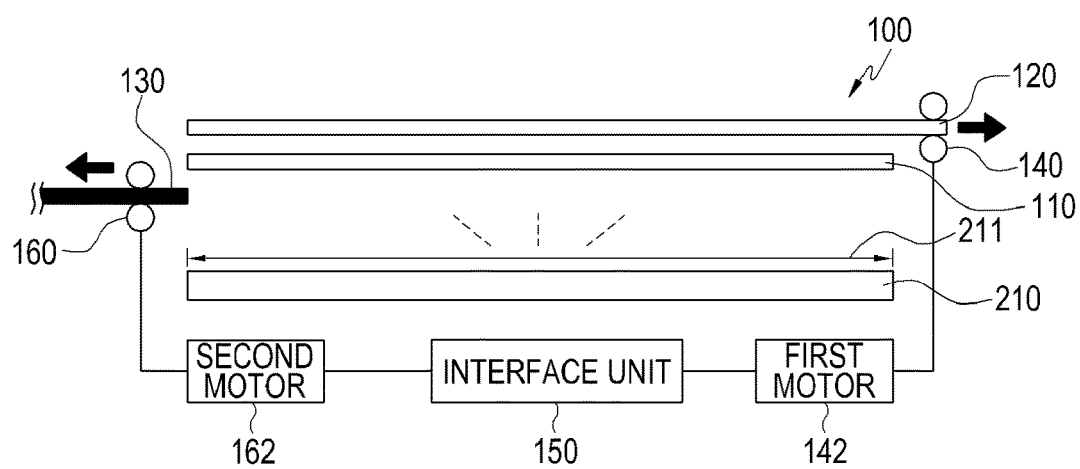
FIG. 15 is a view illustrating a moved state of a light shutter in an image printing device using a display device according to another embodiment of the present invention.

FIG. 14 is a view illustrating an image printing device using a display device according to another embodiment of the present invention, and FIG. 15 is a view illustrating a moved light shutter in an image printing device using a display device according to another embodiment of the present invention.

Referring to FIGS. 14 and 15, the image printing device 100 may further include a first roller 140 for moving the photographic paper 120, the first motor 142 for rotating the first roller 140, and the interface unit 150 for providing a signal for controlling the first motor 142, received from the portable device 200 to the first motor 142. Also, the image printing device 100 may further include a voltage control module (not shown) for controlling a voltage applied to the first motor 142 through the interface unit 150.

Additionally, the image printing device 100 may include a second roller 160 for moving the light shutter 130, and a second motor 162 connected to the interface unit 150, for rotating the second roller 160 in response to a control command received from the portable device 200. The light shutter 130 is disposed between the light collector 110 and the display device 210. Thus, when the light shutter 130 is closed, the light shutter 130 may block light from the display device 210. If the image printing device 100 is connected to the external control device through the interface unit 150 so that the image printing device 100 may communicate with the portable device 200, the external control device 200 may control an on/off operation of the first and second motors 142 and 162. The image printing device 100 may further include a voltage control module (not shown) for controlling a control voltage applied to the second motor 162 through the interface unit 150. FIG. 15 illustrates exposure of the photographic paper 120 to the display device 120 along with movement of the light shutter 130 under the control of the controller 280. In FIG. 15, a full original image may be displayed mirrored in the printing image display area 211 for displaying an image to be printed in the display device 210. Accordingly, the size of the printing image display area 211 corresponds to the sizes of the light collector 110 and the photographic paper 120. For example, the size of the printing image display area 211 may be equal to or larger than the sizes of the light collector 110 and the photographic paper 120.

The interface unit 150 may include a connector for direct wired connection to the portable device 200 or a short-range communication module for wireless connection to the portable device 200 by short-range communication. Thus, the interface unit 150 may be a wired or wireless interface for providing a control signal received from the portable device 200 to the first motor 142 and the second motor 162.

Figure 16:
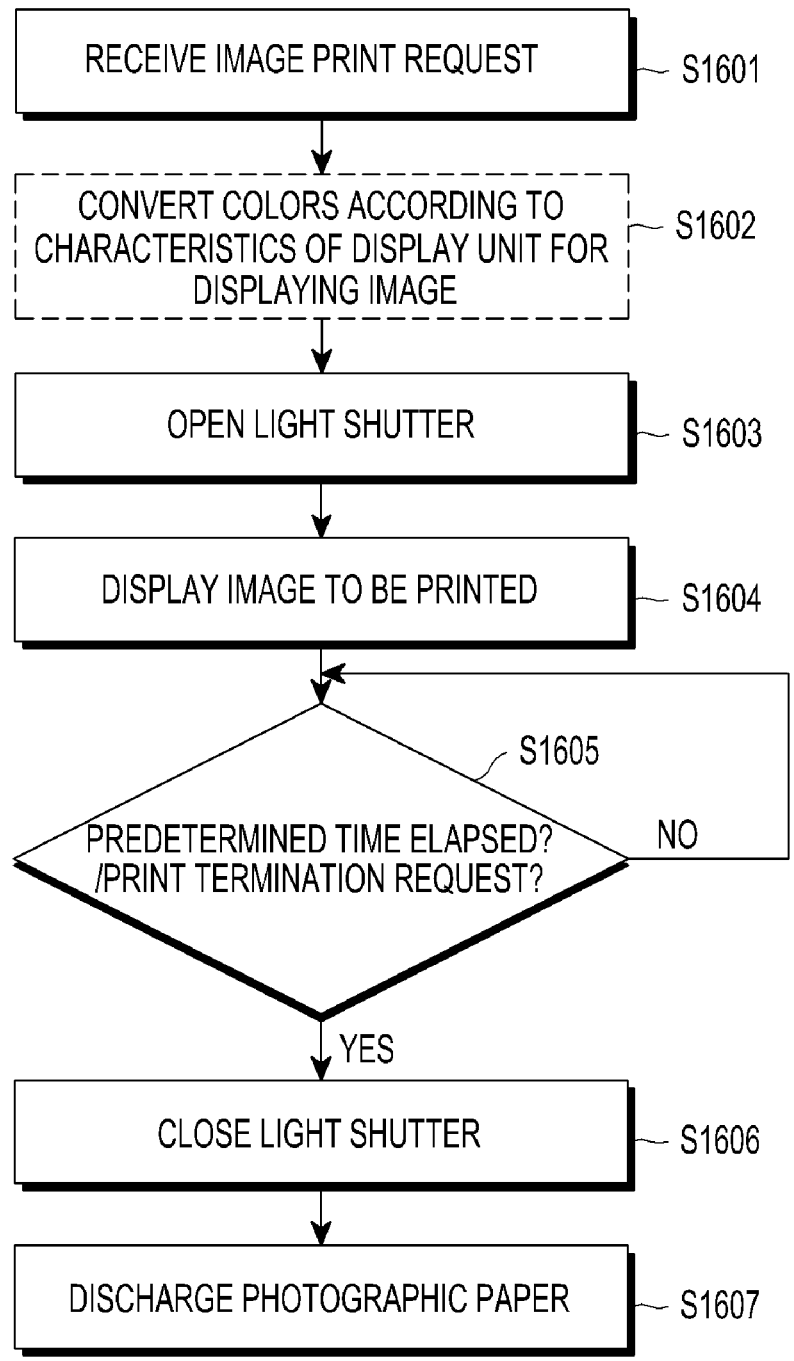
FIG. 16 is a flowchart illustrating an operation for printing an image in an image printing device using a display device according to another embodiment of the present invention.

FIG. 16 is a flowchart illustrating an operation for printing an image in an image printing device using a display device according to another embodiment of the present invention.

Referring to FIG. 16, upon receipt of an image print request through the input unit 220 of the portable device 200 after the user connects the image printing device 100 to the portable device 200, the controller 280 of the portable device 200 receives the image print request in operation S1601. The image requested for printing may be an image pre-stored in the storage 250 of the portable device 200 or an image input to the portable device 200 in real time through the camera unit 230. When the image printing device 100 is engaged with the portable device 200 in this manner, the printing image display area 211 of the display device 210 in which an image to be printed is displayed in the portable device 200 may face the photosensitive surface of the photographic paper 120 in the image printing device 100.

Then, the controller 280 subjects an image displayed in the printing image display area 211 to color conversion according to the characteristics of the display device 210 in operation S1602. The color conversion operation S1602 is optional and thus may be skipped.

The controller 280 exposes the whole photosensitive surface of the photographic paper 120 to the printing image display area 211 by controlling driving of the second motor 162 and thus moving the light shutter 130 in operation S1603.

Subsequently, the controller 280 displays an original image, which is to be printed on the photographic paper 120, in the first display area 211 of the display device 210 in operation S1604. The original image may be displayed mirrored on the display device 210 in operation S1604. Before displaying the original image to be printed in the first display area 211 in operation S1604, the controller 280 may control the entire first display area 211 to display black, thereby preventing exposure of the photographic paper 120 to unnecessary light. Alternatively, the controller 280 may display the original image to be printed in the first display area 211 before opening the light shutter 130. Therefore, light output from the first display area 211 of the display device 210 may be provided to the photographic paper 120 through the light collector 110.

Then, the controller 280 determines whether a predetermined time sufficient to form the original image displayed in the first display area 211 of the display device 210 on the photographic paper 120 has elapsed in operation S1605. Upon expiration of the predetermined time, the controller 280 controls driving of the second motor 162 so that the light shutter 130 may return to its original position in operation S1606. As a consequence, light may be blocked from the display device 210 to the photographic paper 120.

Then, the controller 280 discharges the photographic paper 120 outside of the image printing device 100 in operation S1607.

Meanwhile, if the photographic paper 120 is provided inserted in a cartridge, the operation S1603 for opening the light shutter 130 and the operation S1606 for closing the light shutter 130 may be skipped.

The method for printing an image using a display device according to embodiments of the present invention may be implemented as computer-readable code in a computer-readable recoding medium. The computer-readable recording medium may be any recoding device that stores data readable by a computer system. Examples of the computer-readable recording medium include read only memory (ROM), random access memory (RAM), compact disk-read only memory (CD-ROM), magnetic tape, floppy disk, optical data storage device, and carrier waves such as transmission over the Internet. In addition, the computer-readable recording medium may be distributed over computer systems connected over a network, and computer-readable codes may be stored and executed in a distributed manner.

While the invention has been described in detail with reference to the preferred embodiments thereof, the above embodiments are to be construed in all aspects as illustrative and not restrictive. Also, it will be understood by those skilled in the art that various embodiments may be implemented without departing from the spirit and scope of the invention.

According to an embodiment of the present invention, an apparatus and method for facilitating printing of an image displayed on a display device of a portable device can be provided.

Further, according to an embodiment of the present invention, an apparatus having a simple structure and method for facilitating printing of an image displayed on a display device of a small-size portable device can be provided.

According to an embodiment of the present invention, a cheap image printing device, which does not need a complex internal device such as an application processor or a digital signal processor inside it and is easy to fabricate in a simple structure, can be provided.

What is claimed is:

1. An image printing device using a display device, comprising:
   a light collector for focusing light output from the display device in a direction substantially perpendicular to a screen of the display device;
   a photographic paper which is positioned over the light collector, and on which an image displayed on the display device is formed through exposure to light received from the light collector;
   a roller for, when band images are sequentially displayed on the display device, moving the photographic paper according to display times of the band images, the band images being stretches of line images forming the image stretched in a movement direction of the photographic paper; and
   a motor for rotating the roller,
   wherein movement of the photographic paper in the image printing device is controlled by an external control device having the display device to form the image displayed on the display device on the photographic paper in the image printing device.

2. The image printing device of claim 1, further comprising a light shutter for blocking light provided by the display device,
   wherein the light collector is a linear lens, a planar lens, or a vertical filter, and disposed between the display device and the photographic paper.

3. The image printing device of claim 1, further comprising:
   a light shutter for blocking light provided by the display device;
   a transferring unit for moving the light shutter; and
   an interface unit for receiving, from the external control device, a control command for moving at least one of the photographic paper and the light shutter.

4. The image printing device of claim 1, further comprising:
   a light shutter for blocking light provided by the display device;
   a transferring unit for moving the light shutter;
   an interface unit for receiving, from the external control device including the display device, a control command for moving at least one of the photographic paper and the light shutter; and
   a slot into which the external control device is inserted, wherein with the external control device inserted in the slot, the interface unit is connected directly to a connector of the external control device.

5. A portable device for controlling an image printing device, comprising:
   a display device for displaying an image to be printed;
   a communication unit configured to be connected to an interface unit of the image printing device; and
   a controller for controlling movement of at least one of a photographic paper and a light shutter in the image printing device to form the image displayed on the display device on the photographic paper in the image printing device,
   wherein, as band images are sequentially displayed on the display device, the controller controls the image printing device to move the photographic paper in the image printing device according to display times of the band images, the band images being stretches of line images forming the image to be printed, in a movement direction of the photographic paper.

6. The portable device of claim 5, wherein the controller controls to open the light shutter, displays the image to be printed on a first area of the display device, and, upon expiration of a predetermined time, controls to close the light shutter to block light from the display device.

7. A non-transitory computer-readable storage medium recording a program, the program performing operations of:
   receiving an image print request through an input unit of a portable device;
   displaying an image to be printed, on a display device of the portable device; and
   controlling movement of at least one of a photographic paper and a light shutter in an image printing device connected to the portable device, to form an image displayed on the display device on the photographic paper in the image printing device,
   wherein, as band images are sequentially displayed on the display device, the image printing device is controlled to move the photographic paper in the image printing device according to display times of the band images, the band images being stretches of line images forming the image to be printed, in a movement direction of the photographic paper.

8. The non-transitory computer-readable storage medium of claim 7, wherein upon expiration of a predetermined time after the image to be printed is displayed on a first area of the display device, the light shutter is controlled to close to block light from the display device.

9. The non-transitory computer-readable storage medium of claim 7, wherein a width of each of the band images is larger than a width of a light collector of the image printing device, the light collector focusing light output from the display device in a direction substantially perpendicular to a screen of the display device.

10. The non-transitory computer-readable storage medium of claim 7, the band images are arranged to be in parallel to the light collector of the image printing device, the light collector focusing light output from the display device in a direction substantially perpendicular to a screen of the display device.

11. The image printing device of claim 1, wherein a width of the light collector is smaller than a width of each of the band images.

12. The image printing device of claim 1, wherein the light collector is arranged to be in parallel to the band images.

13. The image printing device of claim 1, further comprising:
- an interface unit including a short-range communication module and configured to receive, from the external control device, a control command for moving the photographic paper through wireless short-range communication by using the short-range communication module.

* * * * *